US 8,255,250 B2

(12) United States Patent
Parker et al.

(10) Patent No.: US 8,255,250 B2
(45) Date of Patent: Aug. 28, 2012

(54) DETERMINING A STOP FROM A LAYOVER IN A MULTI-STOP ITINERARY

(75) Inventors: Roger A. Parker, Shoreline, WA (US); Zhengjie Zhang, Covington, WA (US); Richard Lonsdale, Vancouver (CA); Fredrick W. Ervin, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 1279 days.

(21) Appl. No.: 11/877,436

(22) Filed: Oct. 23, 2007

(65) Prior Publication Data
US 2009/0106083 A1 Apr. 23, 2009

(51) Int. Cl.
*G06Q 10/00* (2012.01)
(52) U.S. Cl. ..................................... 705/7.11
(58) Field of Classification Search .................. None
See application file for complete search history.

(56) References Cited

U.S. PATENT DOCUMENTS

| | | | |
|---|---|---|---|
| 7,418,409 B1 | 8/2008 | Goel | |
| 2005/0033614 A1* | 2/2005 | Lettovsky et al. | 705/5 |
| 2006/0095306 A1* | 5/2006 | Parker et al. | 705/7 |
| 2006/0200370 A1* | 9/2006 | Ratliff et al. | 705/5 |
| 2006/0206363 A1* | 9/2006 | Gove | 705/6 |
| 2006/0265264 A1* | 11/2006 | Sanchez et al. | 705/8 |

OTHER PUBLICATIONS

Lufthansa, "The Art and Science of Marketshare Models," Passenger Utility Function—Slides 8-9, May 20, 2004.
Seshadri, "A Model to Estimate Origin-Transfer-Destination Route FLows and Origin-Destination Segment FLows Across the Continental United States," Utility Function, p. 7, Eq. 1, 2007.

* cited by examiner

*Primary Examiner* — Johnna Loftis
*Assistant Examiner* — Brandi P Parker

(57) ABSTRACT

To determine if an intermediate stop in a multistop travel itinerary is a layover or an intermediate destination, a passenger utility value is calculated for the intermediate stop and the passenger utility value for the intermediate stop is compared to a passenger utility for a layover. The intermediate stop is determined to be a layover in response to the passenger utility value for the intermediate stop being greater than or equal to the passenger utility for a layover and the intermediate stop is determined to be an intermediate destination in response to the passenger utility value for the intermediate stop being less than the passenger utility for a layover.

20 Claims, 3 Drawing Sheets

DETERMINING A STOP FROM A LAYOVER IN A MULTI-STOP ITINERARY

TECHNICAL FIELD

The present disclosure generally relates to identifying components of a travel itinerary. More particularly, the disclosure pertains to a strategy to identify a stop from a layover in a multi-stop travel itinerary.

BACKGROUND

In the airline industry, determining origination-destination (OD) demand is a component of generating flight schedules. The OD demand is relatively easy to determine given a one-way or round trip itinerary. However, in a multi-stop itinerary, it is often very difficult to determine if a stop is an intermediate destination or a layover. Presently, about 20% of all flights are multi-stop flights. Therefore, a significant amount of itinerary data utilized to calculate OD demand is unavailable or unreliable. To address this problem, airlines typically employ a "trip breaking rule" to differentiate a layover from an intermediate destination. Unfortunately, there is not an industry standard trip breaking protocol.

Accordingly, it is desirable to provide a system and method for determining if a stop in a multi-stop travel itinerary is an intermediate destination or a layover that is capable of overcoming the disadvantages described herein at least to some extent.

SUMMARY

The foregoing disadvantages are overcome, to a great extent, by the present disclosure, wherein in one respect a system and method is provided that in some embodiments determines if a stop in a multi-stop travel itinerary is an intermediate destination or a layover.

An embodiment relates to a method of determining if an intermediate stop in a multistop travel itinerary is a layover or an intermediate destination. In this method, a passenger utility value is calculated for the intermediate stop and the passenger utility value for the intermediate stop is compared to a passenger utility for a layover. The intermediate stop is determined to be a layover in response to the passenger utility value for the intermediate stop being greater than or equal to the passenger utility for a layover and the intermediate stop is determined to be an intermediate destination in response to the passenger utility value for the intermediate stop being less than the passenger utility for a layover.

Another embodiment pertains to a computer readable medium on which is embedded computer software having executable code for performing a method of determining if an intermediate stop in a multistop travel itinerary is a layover or an intermediate destination. In this method, a passenger utility value is calculated for the intermediate stop and the passenger utility value for the intermediate stop is compared to a passenger utility for a layover. The intermediate stop is determined to be a layover in response to the passenger utility value for the intermediate stop being greater than or equal to the passenger utility for a layover and the intermediate stop is determined to be an intermediate destination in response to the passenger utility value for the intermediate stop being less than the passenger utility for a layover.

Yet another embodiment relates to an apparatus for determining if an intermediate stop in a multistop travel itinerary is a layover or an intermediate destination. The apparatus include a means for calculating and a means for comparing. The means for calculating calculated a passenger utility value for the intermediate stop. The means for comparing compares the passenger utility value for the intermediate stop to a passenger utility for a layover. The intermediate stop is determined to be a layover in response to the passenger utility value for the intermediate stop being greater than or equal to the passenger utility for a layover and the intermediate stop is determined to be an intermediate destination in response to the passenger utility value for the intermediate stop being less than the passenger utility for a layover.

There has thus been outlined, rather broadly, certain embodiments that the detailed description thereof herein may be better understood, and in order that the present contribution to the art may be better appreciated. There are, of course, additional embodiments that will be described below and which will form the subject matter of the claims appended hereto.

In this respect, before explaining at least one embodiment in detail, it is to be understood that embodiments are not limited in its application to the details of construction and to the arrangements of the components set forth in the following description or illustrated in the drawings. In addition to the embodiments described, the various embodiments are capable of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the various embodiments.

DETAILED DESCRIPTION OF THE PREFERRED EMBODIMENT

Figure 1:
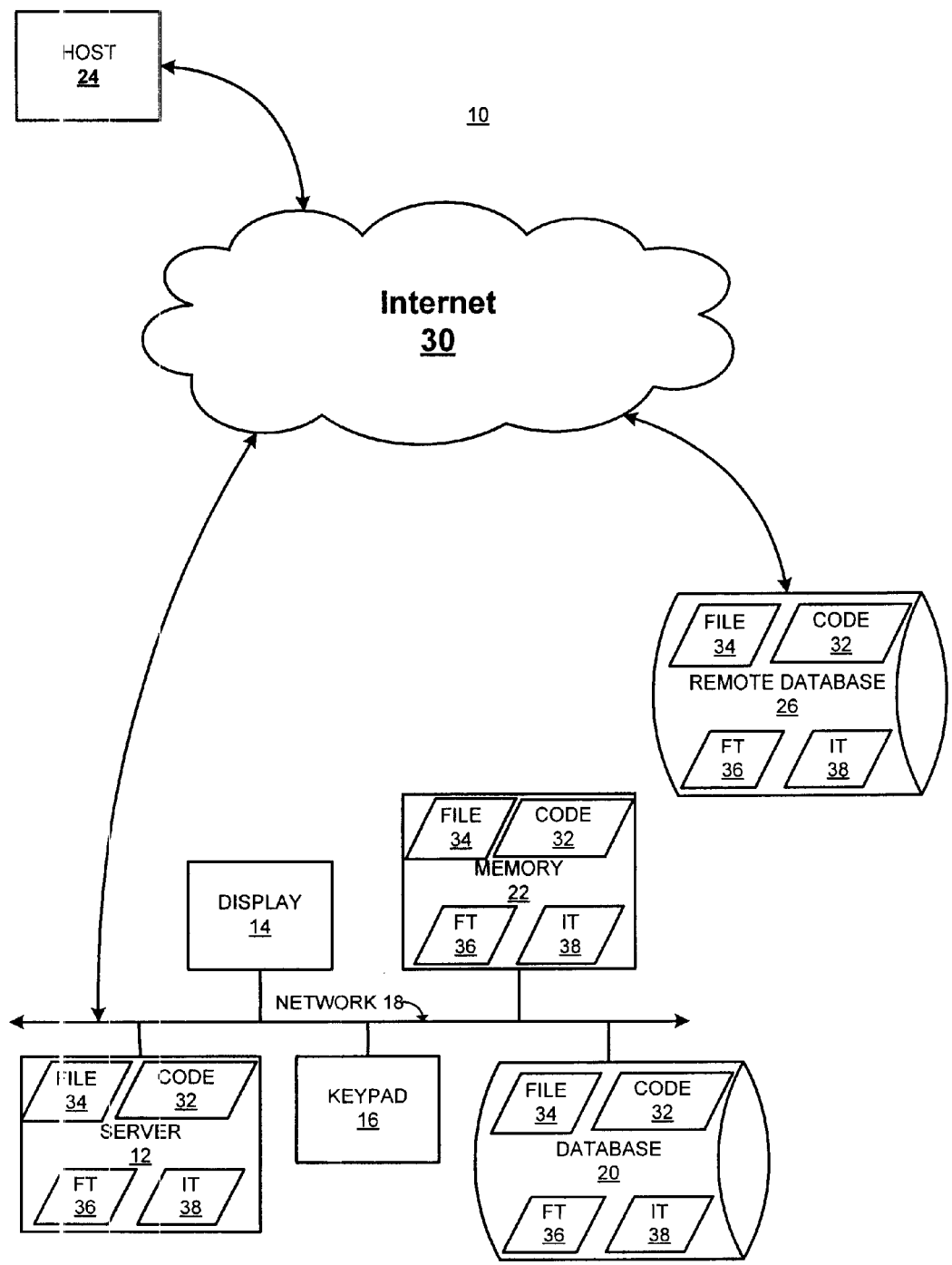
FIG. 1 is a block diagram of a system architecture for a passenger flight scheduling system according to an embodiment.

Scheduling aircraft flights and determining fleet allocations are extremely complex problems. The consequences of improperly allocating resources includes the loss of income for the airline and decreased utility for the passengers. A tool called the Global Market Allocation System (GMAS) analyzes the details of the allocation of passengers to the world's network. This tool is used to understand the impact of the proposed fleet or schedule changes. The quality of the results provided by the GMAS is dependent upon the quality of the flight itinerary data that is analyzed by the GMAS.

The GMAS utilizes scheduled passenger flight itineraries to determine origination-destination (OD) demand. The OD demand is then analyzed to generate future flight schedules and fleet allocations. The OD demand is relatively easy to determine given a one-way or round trip itinerary. However, in a multi-stop itinerary, it is often very difficult to determine if a stop is an intermediate destination or a layover. Presently, about 20% of all flights are multi-stop flights. Therefore, a significant amount of itinerary data utilized to calculate OD demand is unavailable or unreliable.

A trip breaking rule is a method by which a multi-stop airline passenger travel itinerary is broken up into intermediate stops and intermediate destinations. Consider a passenger on a flight itinerary going from airport A to airport C via airport B. That is, the passenger is flying from A to B, then from B to C. If the purpose of the stop in B is to connect to another flight, to drop passengers off, or to pick them up, and if the passenger has no other purpose to stop in B, then that stop is called a layover or an intermediate stop. If the purpose of the stop in B is to do business, visit friends or otherwise stay in B, then such a stop is called an intermediate destination. When examining the ticket coupon description of an itinerary (the record of the ticket coupons that describe the individual legs of a journey), where the passenger is not available for additional elucidation, the trip breaking rule is used to distinguish intermediate stops from intermediate destinations. This is required, for example, in studies of passenger origin-destination demand patterns, which are in turn involved in airline customer fleet analysis.

At the present state of the art in the airline industry, virtually every airline has its own trip breaking rule, and they all differ from each other. In other words, there are many different definitions of what constitutes a "destination" in a particular trip. Since about 20% of all trips have multiple destinations, as opposed to single round-trip itineraries or one-way only itineraries, a significant amount of travel is being analyzed without the benefit of a commonly understood concept of destination. This makes origin-destination (OD) demand estimation difficult, at best, if not impossible.

In an embodiment, a random utility approach is utilized to resolve a layover from an intermediate destination in a multi-stop itinerary. Consider the itinerary described above, an itinerary between two cities, A and C, which has a stop at an intermediate point B. Comparing that itinerary with other itineraries serving the A-C market, the likelihood of A-B-C being a valid travel itinerary for the A-C market may be determined. If A-B-C is an unlikely travel itinerary, this suggests that the passenger might be going from A to B, doing some business in B (otherwise why would the passenger choose such a poor itinerary) and then going on to C. Thus, it seems reasonable to base a trip breaking rule on comparing the utility of an intermediate stop as a stop in a longer path, versus the utility associated with the intermediate stop being a destination in and of itself, one of many in a multi-destination trip. In a hypothetical example, all other factors being equal, if there is a direct flight that is available from A to C and the passenger chooses the A-B-C itinerary, then B is likely to be an intermediate destination. Conversely, again holding all other factors the same, if there is no direct flight available from A to C and B is a typical layover stop, then it is likely that B is a layover. It is an unrealistic simplification to hold all factors the same because the direct flight will take less time that a multi-stop flight. Regarding the term "multi-stop", as used herein, the term multi-stop is used to describe a flight itinerary with one or more stops in addition to the destination stop.

Described mathematically, consider a directional origin-destination (OD) city pair A to C. Let $\Gamma$ be the set of all itineraries in an airline network which serve that OD pair. For a typical passenger (defined to be a hypothetical passenger with average values for each relevant passenger characteristic), let V(i) be the observed passenger utility function for itinerary i. Then the probability of a typical passenger using itinerary i is given by the logic formula $$Pr[\text{using itinerary } i] = \frac{e^{V(i)}}{\sum_{j \in \Gamma} e^{V(j)}} \quad \text{Eqn. 1}$$

Now, it has been found empirically that V is a function of fare, travel time, the number and type of stops (with or without plane change), and other factors. Hold all other factors constant and consider only the total travel time of the itinerary, $t_i$. Denote this dependence by writing $V(i, t_i)$. Let k index a particular itinerary of interest of the set $\Gamma$ (e.g. the specific itinerary under consideration which stops at B), compute $V(k, t_k)$, and then calculate Pr[using itinerary k]=Pr[k] from the above formula. If D is the total demand for travel in the A to C market, then the number of passengers who can expect to be carried on itinerary k is $$d = Pr[k]D = \frac{De^{V(k,t_k)}}{\sum_{j \in \Gamma} e^{V(j,t_j)}} \quad \text{Eqn. 2}$$

If d is sufficiently small, say d<r for some r, then it can be asserted that the stop in B is not part of the trip between A and C, but is a destination in and of itself, since other routes of far higher utility exist for use by the passenger if B is merely an intermediate stop. That is, B is an intermediate destination. Thus a trip breaking rule has been created that is independent of airline, that can be applied to any itinerary in any market, and that is consistent across networks, airlines and time spans.

The "sufficiently small" value of d may be determined by the context of the analysis. In a particular example, empirical results suggest a starting value of d<0.1.

Various embodiments will now be described with reference to the drawing figures, in which like reference numerals refer to like parts throughout. FIG. 1 is a system diagram of a flight scheduling system 10 according an embodiment. As shown in FIG. 1, the flight scheduling system 10 includes a server 12. This server 12 is preferably a computing device such as a personal computer (PC), laptop, handheld, host computer, server, or the like. As such, the server 12 is operable to execute computer readable code, display information to a user and receive input from the user. In this regard, the flight scheduling system 10 includes a display 14 to display information to the user and an input device such as a keyboard 16 operable to receive input from the user. In addition, the flight scheduling system 10 may include any suitable pointing device such as a mouse or touch pad as well as any other suitable computer peripheral device. The server 12 is configured to communicate with any suitable device of the flight scheduling system 10. This attachment may be in the form of wired and/or wireless communication. To communicate with various components, the server 12 is preferably connected via a network 18. In a preferred form, the network 18 utilizes a standardized communication protocol such as Internet Protocol (IP) and/or the like. The network 18 may include a local area network (LAN), wide area network (WAN), wireless network, the Internet, and the like.

The flight scheduling system 10 may, optionally, include a multitude of additional components such as a database 20, memory 22, remote host 24, remote database 26, and the like. These and other components may be configured to intercommunicate with the server 12 in any suitable manner. For example, intercommunication may be performed via wires and/or in a wireless manner. In a particular example, the server 12 may communicate via a network such as the Internet 30. The keypad 16 is configured to provide the user the capability to forward instructions to the server 12. For example, the keypad 16 may include keys to input a command to initiate a code 32. The code 32 is configured to analyze passenger itineraries to determine OD demand. These and any other suitable information may be stored to a file 34. This file 34 may be generated in response to initiation of the code 32 and the information therein may be stored in the form of a table of entries, for example. A particular entry may include the OD demand for a particular destination pair. The server 12 is configured to process the passenger itineraries according to a code 32. The code 32 includes a list of executable instructions readable by the server 12.

The code 32 may exist in a variety of forms both active and inactive. For example, they may exist as software program(s) comprised of program instructions in source code, object code, executable code or other formats. Any of the above may be embodied on a computer readable medium, which include storage devices and signals, in compressed or uncompressed form. Examples of computer readable storage devices include conventional computer system RAM (random access memory), ROM (read only memory), EPROM (erasable, programmable ROM), EEPROM (electrically erasable, programmable ROM), flash memory, and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the program(s) on a CD ROM or via Internet download. In a sense, the Internet itself, as an abstract entity, is a computer readable medium. The same is true of computer networks in general. Also this query approach may be implemented in hardware including ASIC (application specific integrated circuit), custom accelerator logic, programmable logic controller (e.g. FPGA), etc.

The database 20, memory 22, and remote database 26 are configured to store information received from the server 12 and/or other components of the system 10. In a particular example, the database 20, memory 22, and remote database 26 are configured to store the code 32 and file 34. The database 20, memory 22, and remote database 26 may further provide this or other information to the server 12 and/or other components of the system 10. The database 20, memory 22, and remote database 26 may exist in a variety of forms such as, for example, random access memory (RAM), disk storage, electronic erasable programmable read only memory (EEPROM), and/or the like. The remote host 24 may, via the Internet 30 and/or the network 18, be configured to execute the code 32 or instruct the server 12 to execute the code 32.

In addition, at least the database 20 and remote database 26 are configured to store, forward, receive, and append information associated with a flight table 36. The flight table 36 includes information associated with some or all commercial flights. Examples of particular types of information includes origin and destination airports, departure times, arrival times, flight numbers, equipment or type of airplane, seat numbers, and the like. Furthermore, as described herein, at least the database 20 and remote database 26 are configured to store, forward, receive, and append information associated with an itinerary table 38. The itinerary table 38 may include data associated with scheduled and/or completed travel itineraries. Examples of particular types of information stored in the itinerary table 38 includes origin and destination airports, intermediate stop airports, departure dates and times, arrival dates and times, flight numbers, equipment or type of airplane, seat numbers, and the like.

Figure 2:
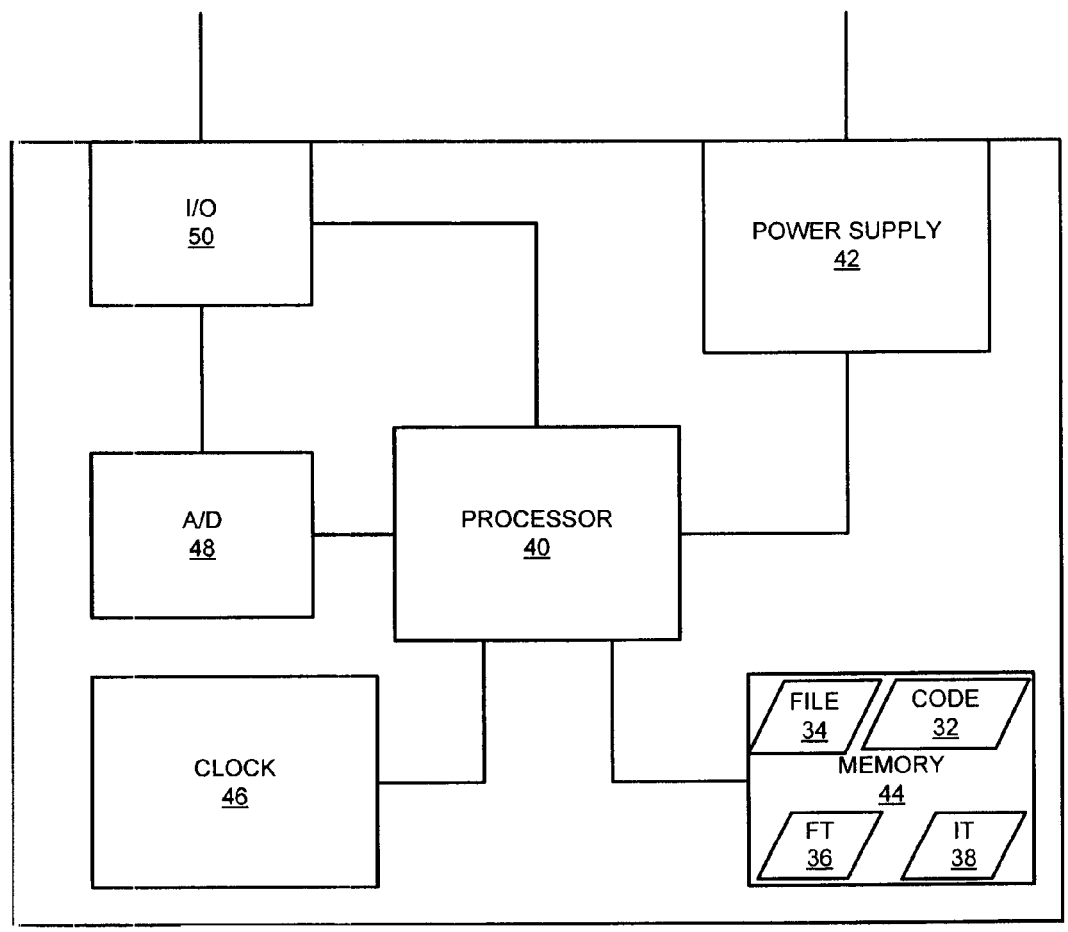
FIG. 2 is a block diagram of a system architecture for a server according to an embodiment of FIG. 1.

FIG. 2 is a system architecture for the server 12 suitable for use in the flight scheduling system 10 according to FIG. 1. As shown in FIG. 2, the server 12 includes a processor 40. This processor 40 is operably connected to a power supply 42, memory 44, clock 46, analog to digital converter (A/D) 48, and an input/output (I/O) port 50. The I/O port 50 is configured to receive signals from any suitably attached electronic device and forward these signals to the A/D 48 and/or the processor 40. For example, the I/O port 50 may receive signals associated with airline flights, origin, destination, date, time, passenger information, and the like and forward the signals to the processor 40. If the signals are in analog format, the signals may proceed via the A/D 48. In this regard, the A/D 48 is configured to receive analog format signals and convert these signals into corresponding digital format signals. Conversely, the A/D 48 is configured to receive digital format signals from the processor 40, convert these signals to analog format, and forward the analog signals to the I/O port 50. In this manner, electronic devices configured to receive analog signals may intercommunicate with the processor 40.

The processor 40 is configured to receive and transmit signals to and from the A/D 48 and/or the I/O port 50. The processor 40 is further configured to receive time signals from the clock 46. In addition, the processor 40 is configured to store and retrieve electronic data to and from the memory 44. In a particular example, the processor 40 is configured to execute the code 32 and, according to the instructions in the code 32, access the flight table 36 and itinerary table 38 and determine OD demand. Furthermore, the processor 40 is configured to determine signals operable to modulate the display 14, a printing device, and/or the like and thereby output or display information associated with the query.

According to an embodiment, the processor 40 is configured to generate a list of OD demand based upon the itinerary table 38. In generating this list of OD demand, the processor 40 is configured to identify intermediate destinations and layovers in multi-stop itineraries. It is an advantage of embodiments of the disclosed system that intermediate destinations and layovers are identified without a universal trip breaking rule. In this regard, there is no universally accepted trip breaking rule currently in place among the worlds air carriers. Developing such a rule would be costly and require at least some air carriers to replace or revise their scheduling software. Clearly, such a proposition would be expensive and could potentially cause scheduling outages for the air carrier.

To avoid these expenses and increase the number of itineraries that can be analyzed, an embodiment as described herein is utilized to determine if intermediate stops in a multi-stop itinerary are intermediate destinations or layovers.

A pseudocode description of the OD demand algorithm is as follows:

```
Load all flight itineraries from the itinerary table 38
   For each itinerary {
      Does itinerary include multiple stops?
         No:   store OD to file 34; next itinerary
         Yes:  {
            store OD to file 34
            Load all flight information from flight table 36
            For each stop {
               Is passenger utility of stop ≧ layover utility?
                  Yes:   stop=layover; next stop
                  No:    {
                     stop=intermediate stop;
```

```
        store OD to file 34;
        next stop}
                }
     Next itinerary}
}
```

This pseudocode may be included in the code 32. When executed, the code 32 is configured to analyze the flight itineraries from the itinerary table 38. For each direct flight taken by a passenger, the OD demand is simply 1 for the OD pair. This OD demand information may be stored to the file 34 and the next itinerary analyzed. In response to identifying a multistop flight, the code 32 is configured to store the OD demand for the OD pair to the file 34 and determine the utility of each intermediate stop. As stated herein, the utility of each intermediate stop is determined by comparing the itinerary with other itineraries in the market. This comparison may be calculated utilizing Eqn. 1 and/or Eqn. 2 as described herein.

Figure 3:
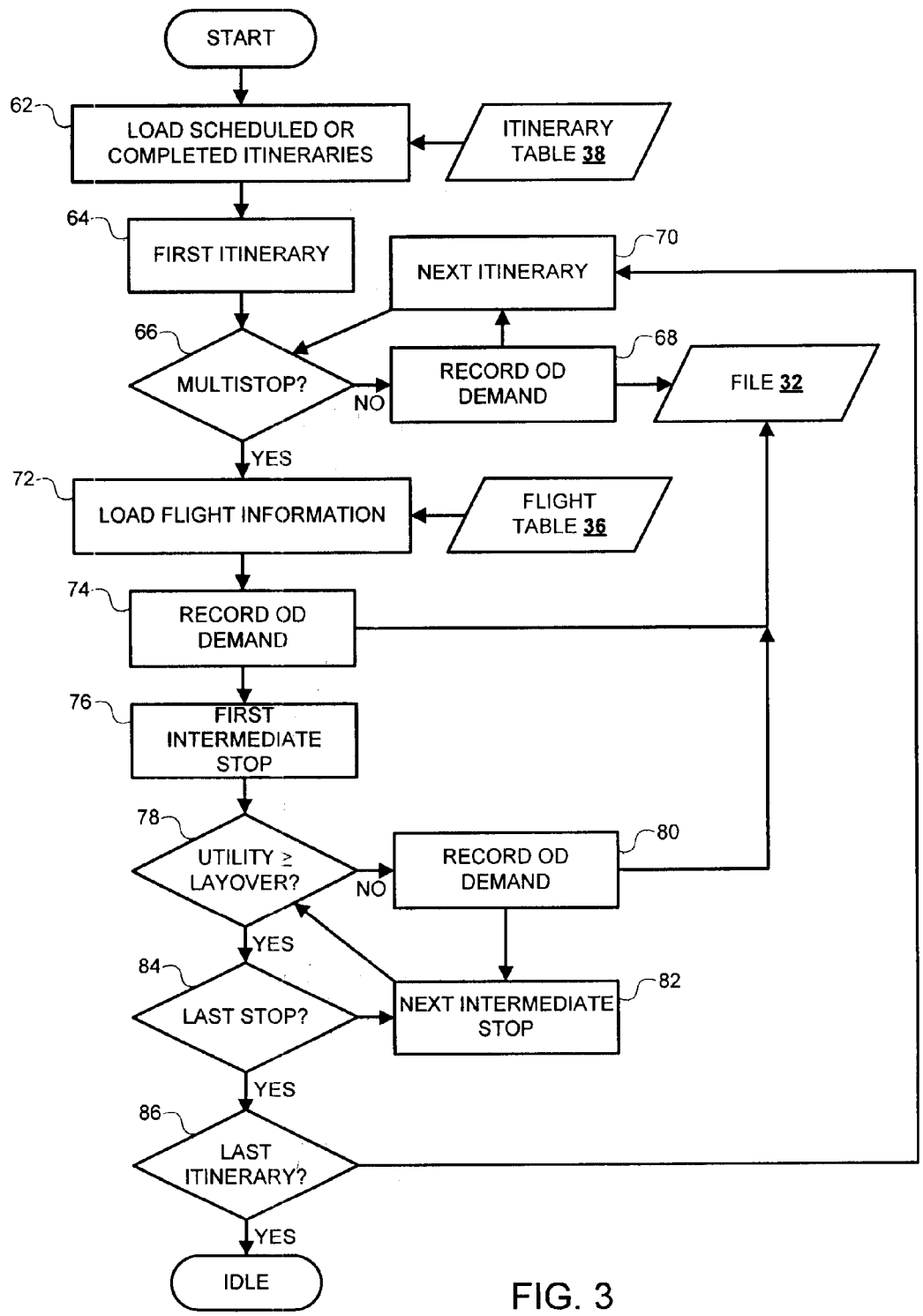
FIG. 3 is a flow diagram of a method illustrating the steps that may be followed in accordance with an embodiment.

FIG. 3 is a flow diagram of a method 60 for determining the OD demand according to an embodiment. Prior to or during the method 60, information associated with some or all commercial flights may be stored to the flight table 36 and data associated with scheduled and/or completed travel itineraries may be stored to the itinerary table 38. The method 60 may be initiated by a user and/or automatically. In a particular example, the method 60 may be automatically initiated on a periodic basis in preparation to generate a flight schedule. In another example, the user may initiate the method 60 in preparation for generating a flight schedule and/or while testing flight schedule scenarios.

In response to initiation, the itinerary table 38 is accessed and scheduled and/or completed flights are loaded into memory. In other instances, the scheduled and/or completed flights may be accessed directly from the itinerary table 38.

At step 64, a first itinerary is analyzed.

At step 66, it is determined if the itinerary is a multistop itinerary. For example, if the itinerary includes a stop in addition to the origination stop and destination stop, it may be determined that the itinerary is a multistop itinerary. If the itinerary is not a multistop itinerary, the OD demand is stored to the file 32 at step 68 and it is determined if the last itinerary has been analyzed at step 86.

In response to the determination that the itinerary is a multistop itinerary at step 66, the flight information is loaded from the flight table 36 at step 72.

At step 74, the OD demand may be stored to the file 32. For example, the origination and destination stop pair may be stored to the file 32. However, in other instances, the origination and destination stop pair may not be stored to the file 32 unless it is determined that the intermediate stop(s) do not include an intermediate destination.

At step 76, a first intermediate stop may be analyzed.

At step 78, the user utility of the intermediate stop may be determined. For example, the utility of the itinerary with the intermediate stop may be compared to the utility of other flights available and/or other scheduled or completed flights by calculating Eqn. 1 and/or Eqn. 2. In response to the passenger utility being less than a predetermined layover utility for the OD market, it may be determined that the intermediate stop is an intermediate destination and the OD demand for the origination and intermediate destination pair may be stored to the file 32 at step 80. Following step 80, In response to the passenger utility being equal to or greater than a predetermined layover utility for the OD market, it may be determined that the intermediate stop is a layover. Following step 78, it is determined if the last intermediate stop has been analyzed. In response to additional intermediate stops, the next intermediate stop is analyzed at step 82. In response to the determination that no additional intermediate stops remain in the itinerary, it is determined if the last itinerary has been analyzed at step 86.

At step 86, it may be determined if the last itinerary has been analyzed. In response to determining that additional itineraries remain to be analyzed, the next itinerary is analyzed at step 88. In response to determining that the last itinerary has been analyzed, the method 80 may idle. For example, if no itineraries remain in memory or an end of file (EOF) command is read, it may be determined that the last itinerary has been analyzed.

The many features and advantages of the various embodiments are apparent from the detailed specification, and thus, it is intended by the appended claims to cover all such features and advantages that fall within the true spirit and scope of the embodiments. Further, since numerous modifications and variations will readily occur to those skilled in the art, it is not desired to limit the embodiments to the exact construction and operation illustrated and described, and accordingly, all suitable modifications and equivalents may be resorted to, falling within the scope of the various embodiments.

What is claimed is:

1. A method of determining if an intermediate stop in a multi stop travel itinerary is a layover or an intermediate destination, the method comprising the steps of:
   calculating a passenger utility value for the intermediate stop;
   calculating a passenger utility value for the layover; and
   comparing the passenger utility value for the intermediate stop to the passenger utility for the layover, wherein the intermediate stop is determined to be a layover in response to the passenger utility value for the intermediate stop being greater than or equal to the passenger utility for a layover and wherein the intermediate stop is determined to be an intermediate destination in response to the passenger utility value for the intermediate stop being less than the passenger utility for a layover;
   at least one of the above steps being performed by a processor.

2. The method according to claim 1 further comprising: calculating the passenger utility value for the intermediate stop with an equation:

$$Pr[\text{using itinerary } i] = \frac{e^{V(i)}}{\sum_{j \in \Gamma} e^{V(j)}}$$

wherein:
   Pr[using itinerary i] is a probability that a passenger would select an itinerary i with the intermediate stop;
   V(i) is an observed passenger utility function for the itinerary i;
   V(i) is the utility function for an itinerary i; and
   $\Gamma$ is a set of all itineraries i in an airline network which serve an origination-destination pair that is the same as the origination-destination pair for the itinerary i.

3. The method according to claim 1, further comprising: calculating the passenger utility value for the intermediate stop with an equation:

$$d = Pr[k]D = \frac{De^{V(k,t_k)}}{\sum_{i \in \Gamma} e^{V(j,t_i)}}$$

wherein:
   d is the number of passengers expected to use an itinerary k of interest;
   Pr[k] is a probability that a passenger would select the itinerary k with the intermediate stop;
   $t_k$ is a travel time for the itinerary k;
   $V(k, t_k)$ is an observed passenger utility function for the itinerary k;
   t(i) is a travel time of the itinerary i;
   $V(i, t_i)$ is the utility function for the itinerary i;
   $\Gamma$ is a set of all itineraries i in an airline network which serve an origination-destination pair that is the same as the origination-destination pair for the itinerary k; and
   D is a total demand for travel in the origination-destination pair market.

4. The method according to claim 3, wherein d<0.1.

5. The method according to claim 1, further comprising:
   determining an origination-destination demand for the multistop itinerary in response to determining if the intermediate stop is a layover or an intermediate destination.

6. The method according to claim 5, further comprising:
   determining a flight schedule in response to determining an origination-destination demand for the multistop itinerary.

7. The method according to claim 1, further comprising:
   loading a set of itineraries; and
   determining if each itinerary of the set of itineraries is a multistop itinerary, wherein the intermediate stop is determined to be a layover or an intermediate destination in response to determining an itinerary of the set of itineraries is a multistop itinerary.

8. A computer program product comprising at least one non-transitory tangible computer readable medium having computer-readable program instructions stored therein that, when executed by a processor, enable a processor-based system to determine if an intermediate stop in a multistop travel itinerary is a layover or an intermediate destination, the computer-readable program instructions comprising:
   calculating a passenger utility value for the intermediate stop;
   calculating a passenger utility value for the layover; and
   comparing the passenger utility value for the intermediate stop to a passenger utility for a layover, wherein the intermediate stop is determined to be a layover in response to the passenger utility value for the intermediate stop being greater than or equal to the passenger utility for a layover and wherein the intermediate stop is determined to be an intermediate destination in response to the passenger utility value for the intermediate stop being less than the passenger utility for a layover.

9. The computer program product according to claim 8, wherein the computer-readable program instructions further comprise:
   calculating the passenger utility value for the intermediate stop with an equation:

$$Pr[\text{using itinerary } i] = \frac{e^{V(i)}}{\sum_{j \in \Gamma} e^{V(j)}}$$

wherein:
   Pr[using itinerary i] is a probability that a passenger would select an itinerary i with the intermediate stop;
   V(i) is an observed passenger utility function for the itinerary i;
   V(i) is the utility function for an itinerary i; and
   $\Gamma$ is a set of all itineraries i in an airline network which serve an origination-destination pair that is the same as the origination-destination pair for the itinerary i.

10. The computer program product according to claim 8, wherein the computer-readable program instructions further comprise:
   calculating the passenger utility value for the intermediate stop with an equation:

$$d = Pr[k]D = \frac{De^{V(k,t_k)}}{\sum_{i \in \Gamma} e^{V(j,t_i)}}$$

wherein:
   d is the number of passengers expected to use an itinerary k of interest;
   Pr[k] is a probability that a passenger would select the itinerary k with the intermediate stop;
   $t_k$ is a travel time for the itinerary k;
   $V(k, t_k)$ is an observed passenger utility function for the itinerary k;
   t(i) is a travel time of the itinerary i;
   $V(i, t_i)$ is the utility function for the itinerary i;
   $\Gamma$ is a set of all itineraries i in an airline network which serve an origination-destination pair that is the same as the origination-destination pair for the itinerary k; and
   D is a total demand for travel in the origination-destination pair market.

11. The computer program product according to claim 10, wherein d<0.1.

12. The computer program product according to claim 8, wherein the computer-readable program instructions further comprise:
   determining an origination-destination demand for the multistop itinerary in response to determining if the intermediate stop is a layover or an intermediate destination.

13. The computer program product according to claim 12, wherein the computer-readable program instructions further comprise:
   determining a flight schedule in response to determining an origination-destination demand for the multistop itinerary.

14. The computer program product according to claim 8, wherein the computer-readable program instructions further comprise:
   leading a set of itineraries; determining if each itinerary of the set of itineraries is a multistop itinerary, wherein the intermediate stop is determined to be a layover or an intermediate destination in response to determining an itinerary of the set of itineraries is a multistop itinerary.

15. An apparatus for determining if an intermediate stop in a multistop travel itinerary is a layover or an intermediate destination, the apparatus comprising:

means for calculating a passenger utility value for the intermediate stop;

means for calculating a passenger utility value for the layover; and means for comparing the passenger utility value for the intermediate stop to a passenger utility for a layover wherein the intermediate stop is determined to be a layover in response to the passenger utility value for the intermediate stop being greater than or equal to the passenger utility for a layover and wherein the intermediate stop is determined to be an intermediate destination in response to the passenger utility value for the intermediate stop being less than the passenger utility for a layover.

16. The apparatus according to claim 15, further comprising:

means for calculating the passenger utility value for the intermediate stop with an equation:

$$Pr[\text{using itinerary } i] = \frac{e^{V(i)}}{\sum_{j \in \Gamma} e^{V(j)}}$$

wherein:
Pr[using itinerary i] is a probability that a passenger would select an itinerary i with the intermediate stop;
V(i) is an observed passenger utility function for the itinerary i;
V(i) is the utility function for an itinerary i; and
$\Gamma$ is a set of all itineraries i in an airline network which serve an origination-destination pair that is the same as the origination-destination pair for the itinerary i.

17. The apparatus according to claim 15, further comprising:

means for calculating the passenger utility value for the intermediate stop with an equation:

$$d = Pr[k]D = \frac{De^{V(k,t_k)}}{\sum_{i \in \Gamma} e^{V(j,t_i)}}$$

wherein:
d is the number of passengers expected to use an itinerary k of interest;
Pr[k] is a probability that a passenger would select the itinerary k with the intermediate stop;
$t_k$ is a travel time for the itinerary k;
V(k, $t_k$) is an observed passenger utility function for the itinerary k;
t(i) is a travel time of the itinerary i;
V(i, $t_i$) is the utility function for the itinerary i;
$\Gamma$ is a set of all itineraries i in an airline network which serve an origination-destination pair that is the same as the origination-destination pair for the itinerary k; and
D is a total demand for travel in the origination-destination pair market.

18. The apparatus according to claim 17, wherein d<0.1.

19. The apparatus according to claim 15, further comprising:

means for determining an origination-destination demand for the multistop itinerary in response to determining if the intermediate stop is a layover or an intermediate destination.

20. The apparatus according to claim 19, further comprising:

means for determining a flight schedule in response to determining an origination-destination demand for the multistop itinerary.

* * * * *